US006523778B2

(12) United States Patent
Key et al.

(10) Patent No.: US 6,523,778 B2
(45) Date of Patent: Feb. 25, 2003

(54) ILLUMINATED EMERGENCY SIGNALING DEVICE AND FLYING BALLOON

(75) Inventors: Craig J. Key, Thousand Oaks, CA (US); Allen Weideman, Agoura Hills, CA (US)

(73) Assignee: The Night Fun Co., LLC, Thousand Oaks, CA (US)

(*) Notice: Subject to any disclaimer, the term of this patent is extended or adjusted under 35 U.S.C. 154(b) by 0 days.

(21) Appl. No.: 09/888,859

(22) Filed: Jun. 25, 2001

(65) Prior Publication Data

US 2002/0000489 A1 Jan. 3, 2002

Related U.S. Application Data

(63) Continuation-in-part of application No. 09/606,488, filed on Jun. 29, 2000.

(60) Provisional application No. 60/268,562, filed on Feb. 13, 2001.

(51) Int. Cl.[7] .................. B64R 1/40

(52) U.S. Cl. .................. 244/31; 362/84; 40/212

(58) Field of Search .................. 362/186, 84; 244/194, 244/31; 40/212, 214

(56) References Cited

U.S. PATENT DOCUMENTS

| | | | | | |
|---|---|---|---|---|---|
| 242,483 | A | * | 6/1881 | Samwald | 244/33 |
| 2,629,115 | A | * | 2/1953 | Hansen | 116/107 |
| 2,842,090 | A | * | 7/1958 | Sisson | 116/210 |
| 3,002,490 | A | * | 10/1961 | Murray | 116/210 |
| 4,076,645 | A | | 2/1978 | Vega | |
| 4,292,999 | A | * | 10/1981 | Szollmann | 116/210 |
| 4,313,843 | A | | 2/1982 | Bollyky et al. | |
| 4,508,642 | A | * | 4/1985 | World | 252/183.13 |
| 4,521,972 | A | * | 6/1985 | Larson | 33/265 |
| 4,678,608 | A | | 7/1987 | Dugliss | |
| 4,698,183 | A | | 10/1987 | Koroscil | |
| 4,717,511 | A | | 1/1988 | Koroscil | |
| 4,787,575 | A | * | 11/1988 | Stewart | 116/210 |
| 4,920,674 | A | * | 5/1990 | Shaeffer | 116/210 |
| 5,043,851 | A | | 8/1991 | Kaplan | |
| 5,117,344 | A | * | 5/1992 | Perez | 362/190 |
| 5,122,306 | A | | 6/1992 | Van Moer et al. | |
| 5,158,349 | A | | 10/1992 | Holland et al. | |
| 5,232,653 | A | | 8/1993 | Addeo et al. | |
| 5,429,244 | A | * | 7/1995 | McCreary | 116/210 |
| RE35,007 | E | | 8/1995 | Cohen et al. | |
| 5,705,103 | A | | 1/1998 | Chopdekar et al. | |
| 5,824,242 | A | | 10/1998 | Ladyjensky | |
| 6,106,135 | A | * | 8/2000 | Zingale et al. | 362/186 |
| 6,146,001 | A | * | 11/2000 | Cwiakala | 362/186 |

OTHER PUBLICATIONS

Article by The CHEMLIGHT Site entitled "Lightstick Products for Government and Military Personnel".

* cited by examiner

*Primary Examiner*—Michael J. Carone
*Assistant Examiner*—Gabriel S. Sukman
(74) *Attorney, Agent, or Firm*—Kelly Bauersfeld Lowry & Kelley, LLP

(57) ABSTRACT

A process for creating a flying light source including the steps of providing an inflatable balloon and associating a light source therewith. A retaining filament is attached to the inflated balloon. The light source may be a chemiluminescent lighting device which is attached to, or inserted into, the balloon. Alternatively, the light source may be a battery-operated light assembly attached to the balloon. The invention may be in the form of a rescue kit including the inflatable balloon, the chemiluminescent lighting device, the retaining filament and a lighter-than-air gas source. Alternatively, the invention may be in the form of a self-contained signaling device including a canister of lighter-than-air gas, a nozzle for dispensing the gas, the battery-operated light assembly, and the filament.

21 Claims, 4 Drawing Sheets

ILLUMINATED EMERGENCY SIGNALING DEVICE AND FLYING BALLOON

RELATED APPLICATION

This application is a continuation-in-part application of Ser. No. 09/606,488, filed Jun. 29, 2000, and further claims priority from provisional application Ser. No. 60/268,562, filed Feb. 13, 2001.

BACKGROUND OF THE INVENTION

The present invention generally relates to balloons and signaling devices. More particularly, the present invention relates to an illuminated emergency signaling device and flying balloon which are visible at night.

Balloons are typically constructed of a lightweight and disposable material such as Mylar, rubber or latex so as to be inexpensive and readily float when filled with a lighter-than-air gas such as helium. Balloons are offered in a variety of colors, shapes, and sizes to meet a variety of purposes. Typically, these purposes include amusement and promotional advertising. The balloons may be used to decorate a party or other event. Balloons are often used to capture the attention of potential consumers to a sales event provided by a retailer.

However, the balloon's usefulness in entertaining, signaling or promoting diminishes as the sun sets and it becomes night. This is due to the fact that the balloons are not visible at night. An inexpensive and effective way of illuminating a flying balloon has been lacking.

Various means of signaling, such as during an emergency or military operations, have been used in the past. For example, fires or smoke may be used. Alternatively, light sources such as flashlights are used to signal others. However, these methods are typically restricted to ground level and can only be seen for a limited distance, particularly if obstructions such as trees and hills block the view of these signals. More recently, ignitable flares have been used which are shot from a gun or the like and into the air for signaling the location of the person. Although typically rising above obstructions, such as trees and small hills, allowing those from the ground or air to see the flare, the flares illuminate the area over the person for only a very short period of time. Also, such flares can be very dangerous to use and store and can even ignite a field, forest, building, or spilled flammable liquids surrounding the person in distress.

Accordingly, there is a need for an illuminated flying balloon which is relatively inexpensive and easy to produce. What is also needed is an emergency signaling device that is safe, effective, and of a prolonged duration. The present invention fulfills these needs and provides other related advantages.

SUMMARY OF THE INVENTION

The present invention relates to an illuminated flying light source, particularly a balloon and a process of creating the same for use as a signaling device, for entertainment, or as a promotional device. The process for creating such a flying light source generally comprises the steps of providing an inflatable balloon and associating a light source with the balloon. The balloon is then filled with a lighter-than-air gas, which is sealed within the balloon. A retaining filament is then attached to the balloon in order to control the altitude of the balloon.

In a first embodiment, the illuminated flying balloon generally comprises a balloon which is at least partially translucent or transparent. The translucent area of the balloon can be formed into a design, which can create a logo or a message. The balloon defines an inner chamber which can be sealed. A chemiluminescent substance is disposed within the chamber. Typically, the chemiluminescent substance is contained within a lighting device which comprises a flexible light-transmitting housing containing a first chemical mixture and a substantially rigid inner container containing an activator which when broken releases the activator into the first chemical mixture to produce chemical light. A lighter-than-air gas, such as helium, is disposed within the chamber to grant buoyancy to the balloon. The retaining filament is then attached to the balloon.

The process for creating the illuminated flying balloon generally comprises the steps of first inserting an activated chemiluminescent substance, such as the lighting device described, within the balloon. A hollow tube may be placed into a neck of the balloon to facilitate the insertion of the chemiluminescent substance. The balloon is then filled with the gas and the chemiluminescent substance and the gas are sealed within the balloon by tying, use of clips, or other means well known in the art.

The illuminated flying balloon of the present invention can be incorporated into a rescue kit comprising a balloon, a chemiluminescent substance, means for discharging gas into the balloon such as a helium canister having a nozzle, and a retaining filament such as string.

In a second embodiment, the invention comprises a self-contained emergency signaling device. The device generally comprises a canister containing lighter-than-air gas, such as helium, and a nozzle for dispensing the gas from the canister. An inflatable balloon has an end disposed over the nozzle for introducing the gas within the balloon. A light source is associated with the balloon. The light source preferably comprises a battery-operated light assembly. The light assembly includes a light emitting diode and two batteries biased towards one another and separated by a removable non-conductive flap. A collar is typically disposed over an upper end of the canister and nozzle, the collar having a reel rotatably connected thereto upon which filament is wound. A lid is detachably connected to the collar, and the inflatable balloon disposed within the lid. Preferably, the balloon includes a one-way valve associated therewith for permitting the gas to pass into the balloon, and preventing escape of the gas from the balloon.

In the event of an emergency, the lid is removed from the collar, and the balloon is inflated with the lighter-than-air gas from the canister using the nozzle. The light assembly is activated by removing the non-conductive flap, resulting in the batteries contacting one another and completing the circuit to illuminate the light illuminating diode. The balloon is attached to the filament and the balloon allowed to rise to the proper altitude using the reel.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
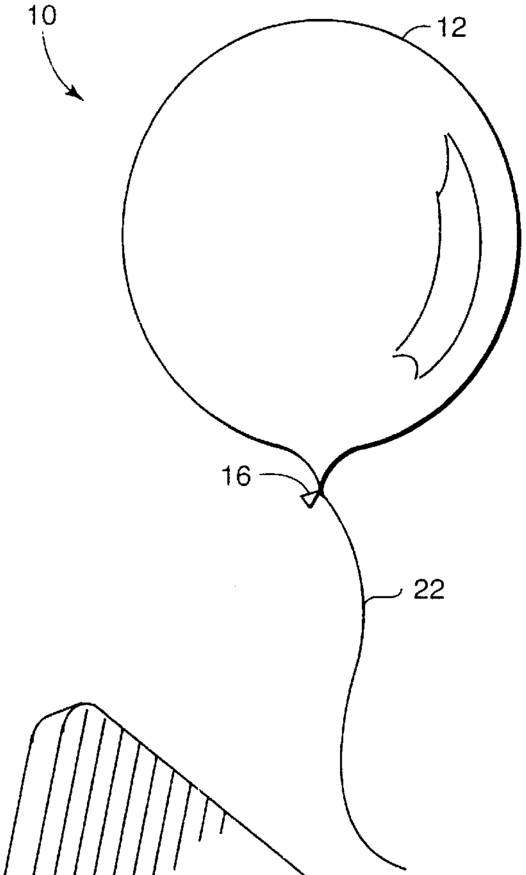
FIG. 1 is an elevational view of an illuminated flying balloon according to a first embodiment of the present invention.

As shown in the drawings for purposes of illustration, the present invention is concerned with an a process for creating a flying light source, such as the illuminated flying balloon 10 illustrated in FIG. 1. The invention is created by providing a balloon 12 which forms an internal gas chamber 14. The balloon 12 can be made of all types of materials and can vary in size or shape so long as the gas chamber 14 is large enough to hold a sufficient amount of lighter-than-air gases to compensate for the weight of the balloon. A light source, such as a chemiluminescent substance which can be in the form of a chemiluminescent lighting device 20 or battery-operated light assembly 54 as more fully described herein, is associated with the balloon 12. The balloon 12 is then filled with lighter-than-air gas which is sealed within the balloon 12. A retaining filament 22 or the like is attached to the balloon 12 so as to elevate the balloon 12 to a desired height.

Figure 2:
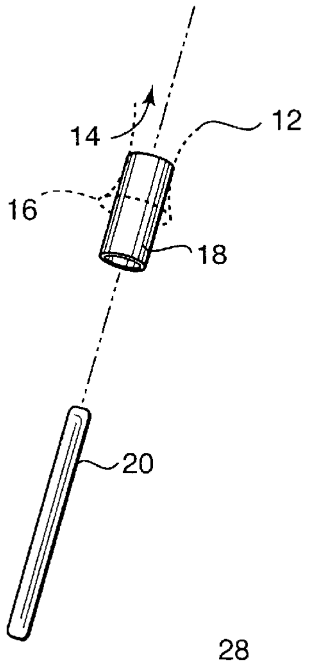
FIG. 2 is a perspective view of a hollow tube inserted into a neck of a balloon, shown in phantom, in order to facilitate the placement of a chemiluminescent lighting device through the hollow tube and into the balloon in accordance with the present invention.

A first embodiment of the present invention is illustrated in FIGS. 1 and 2, wherein prior to inflating the balloon 12, a neck 16 or other opening of the balloon 12 is stretched open for the insertion of the chemiluminescent substance. A hollow pipe or tube 18 may be inserted into the opening of the balloon 12 by stretching the neck 16 around the preferably rigid tube 18. This facilitates the insertion of the chemiluminescent substance into the chamber 14 of the balloon 12.

The chemiluminescent substance is typically contained within a chemical lighting device 20 which includes coextensive inner and outer containers. The outer container comprises a flexible light-transmitting-housing which can be of varying outer dimensions. The inner container is rigid and breakable upon flexation of the outer housing. The inner container contains a first chemical, typically an oxalate compound. The outer container contains an activator component, such as hydrogen peroxide, which surrounds the inner container. When the outer container is flexed, the inner rigid container breaks and the first chemical mixes with the activator to produce a chemical light. Fluorescents and dyes can be added to the container to impart different colors to the device 20. Such chemical lighting devices 20 are well known in the art and can be of varying sizes, shapes and colors. Such a device is disclosed in U.S. Pat. No. 5,158,349 to Holland et al. (the contents of which are hereby incorporated by reference). Such chemical lighting devices 20 are sold under the trademarks Cyalume®, Lightstick or Glow Stick®, manufactured by Omniglow®.

Prior to inserting the chemical lighting device 20 in the balloon 12 it must first be activated. As described above, this is done by snapping and breaking the inner container and shaking the device 20 causing the chemicals to mix and react to produce chemiluminescent light. The chemical lighting device 20 is then inserted into the gas chamber 14 of the balloon 12 in the manner described above. In some cases there is no need for the rigid hollow tube 18 as the balloon opening may be large enough to stretch around the chemical lighting device 20.

After the lighting device 20 is within the balloon's chamber 14, the balloon is inflated with gas. Typically, this gas is lighter than air such as helium. This is typically done by way of a filler nozzle 32 attached to a gas tank 30. The neck 16 of the balloon 12 is securely held against the nozzle 32 so as not to allow the escape of the gas as it fills the gas chamber 14. Once the balloon 12 is fully inflated, the neck 16 of the balloon 12 is tightly closed so as to seal the contents of the balloon 12. The balloon 12 may include a self-sealing neck (not shown) or be tied off or clipped as is well known in the art.

The balloon 12 is at least partially comprised of a transparent or translucent material so that the light from the chemiluminescent substance can be seen through the balloon 12. The combination of different colored chemical lighting devices 20 and translucent balloon materials give varying and distinct colors.

The illuminated flying balloon 10 is typically attached to a retaining filament 22, such as a light string or fishing line. This can be done by tying the filament 22 to either the clip (not shown) or the neck 16 of the sealed balloon 12. The filament 22 can be as long or short as desired. The filament 22 can also be attached to a spool or reel which can be used to control the altitude of the flying balloon 10 much in the same fashion as flying a kite.

Figure 3:
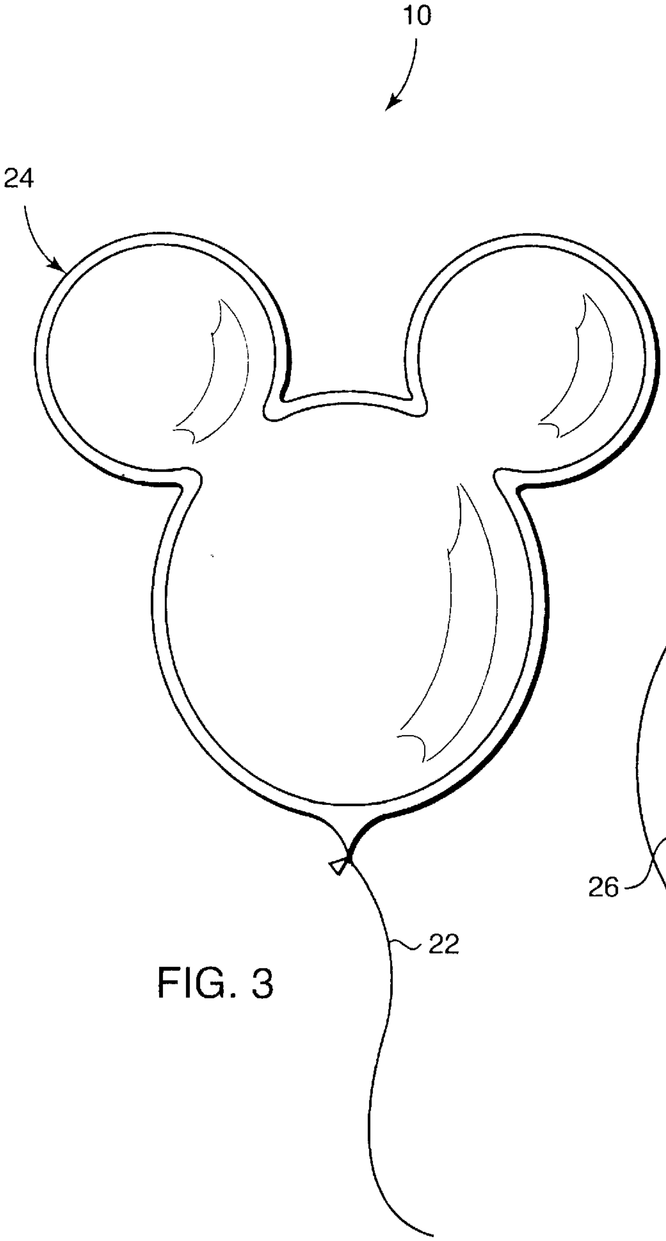
FIG. 3 is an elevational view of another illuminated flying balloon configured for promotional purposes.
Figure 4:
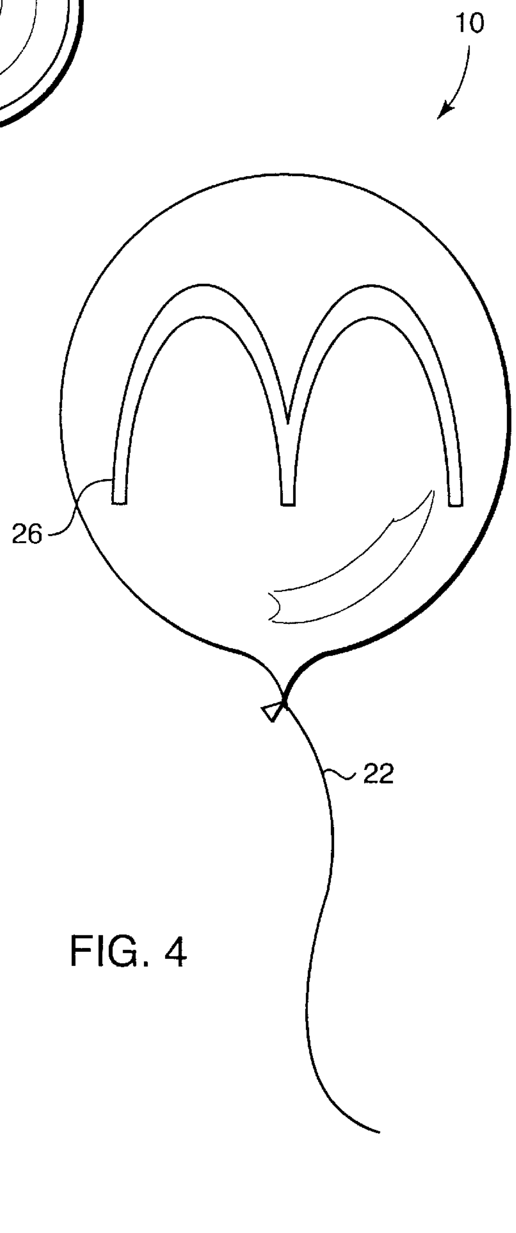
FIG. 4 is yet another illuminated flying balloon embodying the present invention and incorporating a logo.

Referring to FIGS. 3 and 4, although the illuminated flying balloons 10 of the present invention can simply be used as a novelty item for amusement or decoration, the balloons 12 themselves may also be configured in shape 24 and/or translucent area design 26 such that a desired image of a logo, trademark or message of a company or theme park can be lit up by the invention at night. In the darkness of night these balloons stand out and draw attention to the business or theme park.

Figure 5:
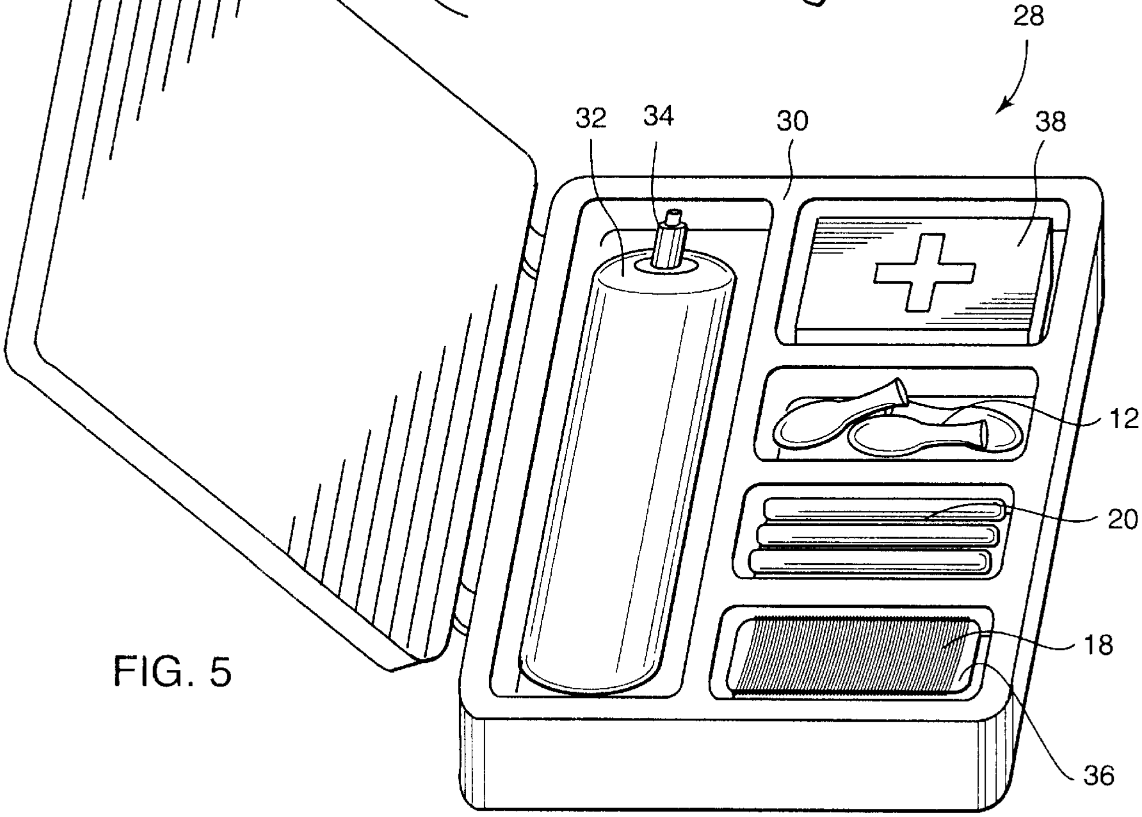
FIG. 5 is a perspective view of a rescue kit incorporating the present invention.

Referring now to FIG. 5, the illuminated flying balloon 10 can be incorporated into a rescue kit 28 comprised of a housing 30 containing a portable gas tank 32 having a nozzle 34, a spool or reel 36 of filament 22 or the like, chemical lighting devices 20, and translucent or transparent balloons 12. The rescue kit 28 may also contain a first aid kit 38. The gas tank 32 contains helium or other lighter-than-air gas. Optionally, the tank 32 contains chemicals that when mixed react and produce lighter-than-air gases which can be then be dispensed into the balloon 12. When in danger or in need of rescue, an illuminated flying balloon 10 is created as described above and elevated to a height where rescuers and others can determine the location of those in need. Such a kit 28 could also be feasibly used with an infrared chemical lighting device 20 in order that the location of military personnel on a covert operation can be readily ascertained by those using infrared sensors while remaining invisible at night to others. The present invention would work well on land as well as by sea and could be seen at night from great distances. The illuminated flying balloon 10 of the present invention could also be used as a signaling device to lead someone to a designated place such as a place of business or someone's house.

Figure 6:
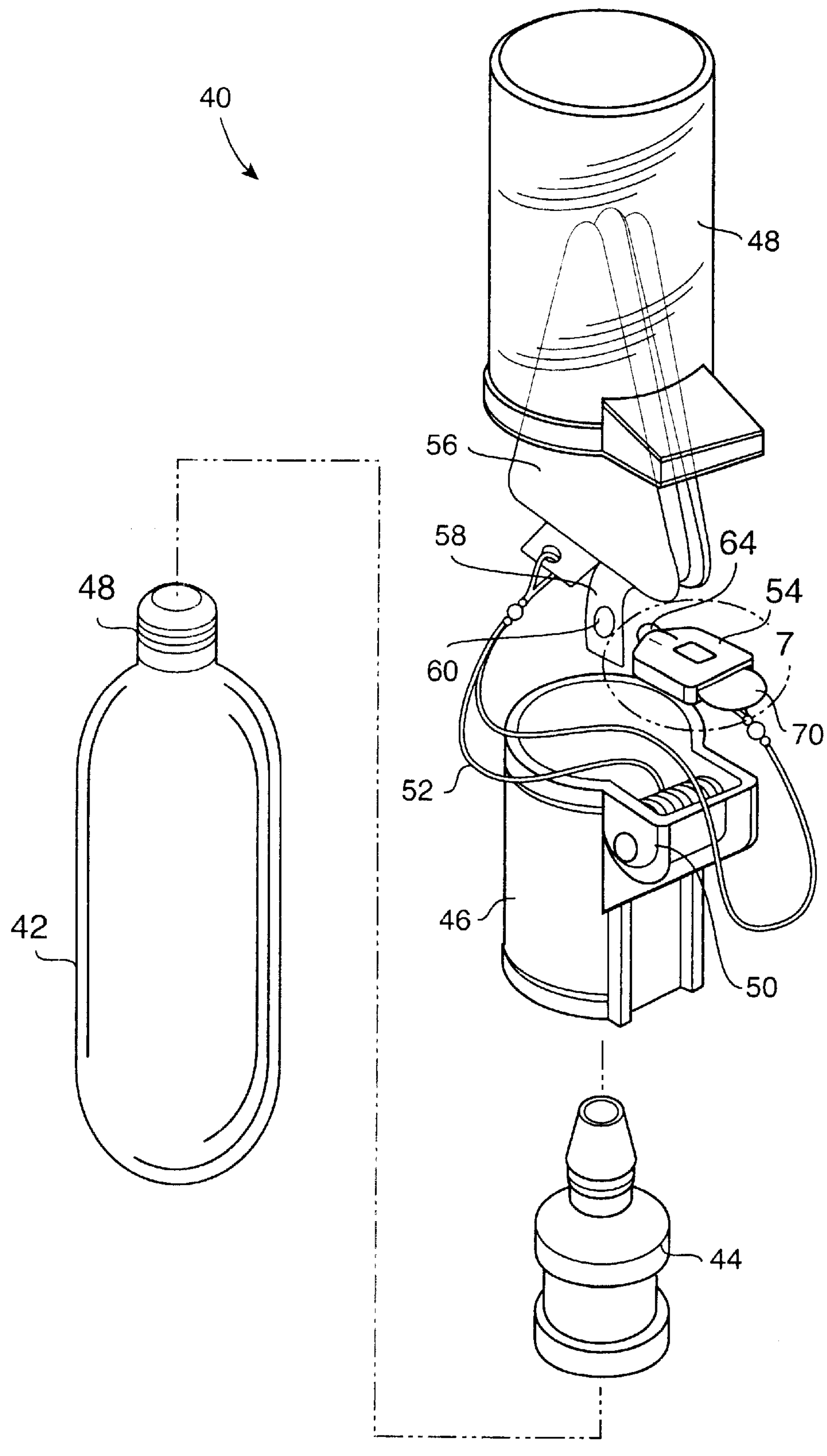
FIG. 6 is an exploded perspective view of an emergency signaling device according to a second embodiment of the present invention.

With reference now to FIG. 6, an emergency signaling device, generally referred to by the reference number 40, according to another embodiment of the present invention is shown. The device 40 is self-contained and includes a lighter-than-air gas canister 42 which forms a base of the device 40. A nozzle 44 is placed over a neck 46 of the canister 42 for selectively dispensing the helium. A collar 46 surrounds the nozzle 44 and is configured to receive the helium canister 42 at one end thereof, and a lid 48 at the opposite end thereof. Typically, the lid 48 is plastic and configured to be snap-fitted to the collar 46. A reel 50 having a predetermined length of filament 52 would thereon is connected to the collar 46 in such a manner so as to enable the reel to freely spin. The filament 52 is connected to a battery-operated light assembly 54 and an inflatable lifting balloon 56. The balloon 56 is preferably comprised of Mylar to resist puncturing and have a metallic, reflective exterior surface so as to be readily seen. The balloon 56 is folded within the kit 48 and includes a flap 58 which is configured to be placed over the nozzle 44 to introduce the helium into the balloon 56. To prevent helium from escaping the inflated balloon 56, the flap 58 includes a one-way valve 60 so as to permit helium to enter into the balloon 56, while preventing the helium from escaping therefrom.

Figure 7:
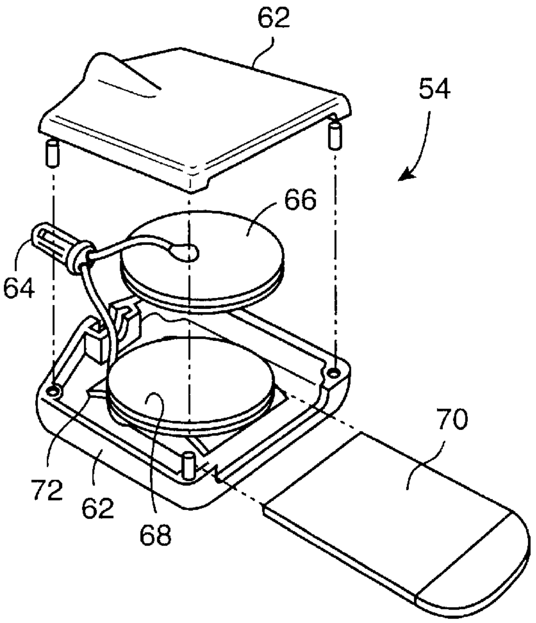
FIG. 7 is an exploded perspective view of a light assembly used in accordance with the emergency signaling device of FIG. 6.

With reference now to FIG. 7, a preferred light assembly 54 used in accordance with the invention is illustrated. The assembly kit 54 includes an outer housing 62 typically comprised of an inexpensive material such as plastic or the like. A light source 64, such as a light emitting diode, is electrically connected to two batteries 66 and 68, such as wafer batteries used in watches and the like. A removable non-conductive tab 70 is positioned between the batteries 66 and 68 to create an open circuit, preventing the light source 64 from becoming illuminated to conserve the life of the batteries 66 and 68 when not in use. A spring 72 or the like is used to press the batteries 66 and 68 into electrical contact with one another when the tab 70 is removed. The light source 64 then flickers, such as a strobe light, to draw attention to the inflated balloon 56 during daylight hours, while enabling search and rescue members to view the location of those in need during the night. In a particularly preferred embodiment, the light source 64 flashes to a controlled sequence which spells "S.O.S." in Morse code.

Figure 8:
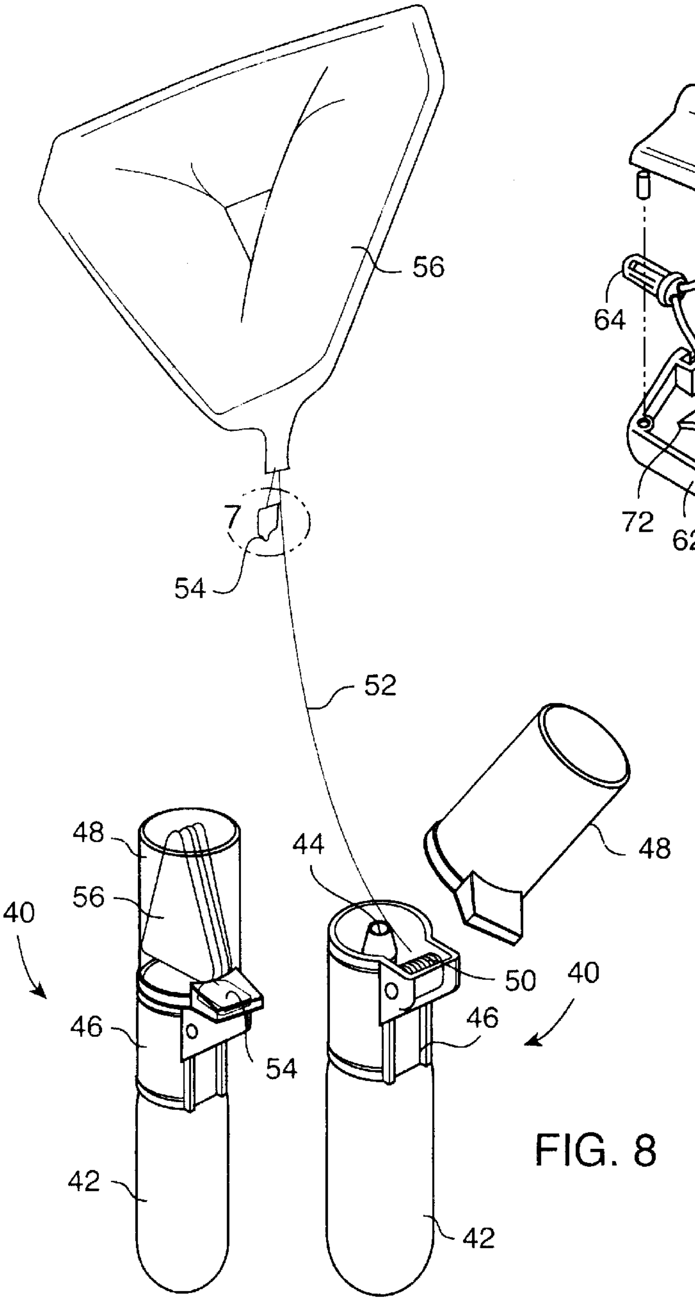
FIG. 8 are perspective views of the emergency signaling device in use.

Referring now to now to FIG. 8, in use, the lid 48 is detached from the collar 46 and the folded balloon 56 removed from the lid 48. The nozzle 44 is tightened upon the neck 46 of the helium canister 42, or otherwise actuated, so that helium can be directed through the nozzle 44. The open end flap 58 of the balloon 56 is placed over the nozzle and the balloon 56 is filled with the lighter-than-air gas. The non-conductive tab 70 is removed from the battery-operated light assembly 54 so that the battery 66 and 68 are biased into conductive contact with one another, causing the light source 64 to illuminate and flash. The balloon 56 is then ascended into the air using reel 50 until the balloon 56 reaches a desired height.

The reader will appreciate that the present invention provides a highly reliable and economical way to utilize balloons at night. Tethering the balloons 12 and 54 at different heights and utilizing different colors creates spectacular decoration and draws attention at night. Such attention can be utilized in emergency situations. Both the kit 28 and emergency signaling device 40 can be used to rescue persons stranded after, for example, an aircraft accident, boating accident or the like.

Although several embodiments of the present invention have been described in detail for purposes of illustration, various modifications of each may be made without departing from the spirit and scope of the invention. Accordingly, the invention is not to be limited, except as by the appended claims.

What is claimed is:

1. A process for creating a flying light source, comprising the steps of:

providing an inflatable balloon;

associating a light source with the balloon;

filling the balloon with lighter-than-air gas;

sealing the lighter-than-air gas within the balloon;

attaching a retaining filament to the balloon;

creating a self-contained signaling device comprising a canister containing lighter-than-air gas, a nozzle for dispensing the lighter-than-air gas from the canister into the inflatable balloon, a battery-operated light assembly attached to the inflatable balloon, and the filament attached to the inflatable balloon; and disposing a collar over an upper end of the canister and the nozzle, the collar having a reel rotatably connected thereto, wherein the filament is wound onto the reel, and detachably connecting a lid to the collar, wherein the inflatable balloon is disposed within the lid.

2. The process of claim 1, wherein the balloon is at least partially translucent or transparent and wherein the associating step comprises the step of inserting an activated chemiluminescent substance into the balloon.

3. The process of claim 2, wherein the inserting step includes inserting a chemiluminescent lighting device within the balloon.

4. The process of claim 3, wherein the chemiluminescent lighting device comprises a flexible light-transmitting housing containing a first chemical mixture, and a substantially rigid inner container containing an activator which when broken releases the activator into the first chemical mixture to produce light.

5. The process of claim 3, wherein the inserting step includes the step of utilizing a hollow tube placed into a neck of the balloon to facilitate the insertion of the chemiluminescent lighting device.

6. The process of claim 2, including the step of configuring the area of at least partial translucency of the balloon into a design or logo.

7. The process of claim 2, including the step of configuring the area of at least partial translucency of the balloon into a design comprising a message.

8. The process of claim 3, including the step of creating a rescue kit comprising the inflatable balloon, the chemiluminescent lighting device, the retaining filament, and a lighter-than-air gas source.

9. The process of claim 1, wherein the associating step comprises attaching an activatable battery-operated light assembly to the balloon.

10. The process of claim 9, wherein a light emitting diode of the light assembly is activated removing a non-conductive flap separating two batteries biased towards one another.

11. A self-contained emergency signaling device, comprising:

a canister containing lighter-than-air gas;

a nozzle for dispensing the lighter-than-air gas from the canister;

an inflatable balloon having an end disposed over the nozzle for introducing the lighter-than-air gas within the balloon;

a filament attached to the balloon;

a light source associated with the balloon; and a collar disposed over an upper end of the canister and the nozzle, the collar having a reel rotatably connected thereto, wherein the filament is wound onto the reel.

12. The device of claim 11, including a lid detachably connected to the collar, wherein the inflatable balloon is disposed within the lid.

13. The device of claim 11, including a one-way valve associated with the balloon for permitting the gas to pass into the balloon, and preventing escape of the gas from the balloon.

14. The device of claim 11, wherein the light source comprises a battery-operated light assembly.

15. The device of claim 14, wherein the light assembly includes a light emitting diode.

16. The device of claim 14, wherein the light assembly includes two batteries biased towards one another and separated by a removable non-conductive flap.

17. A self-contained emergency signaling device, comprising:

a canister containing lighter-than-air gas;

a nozzle for dispensing the lighter-than-air gas from the canister;

an inflatable balloon having an end disposed over the nozzle for introducing the lighter-than-air gas within the balloon;

a collar disposed over an upper end of the canister and the nozzle;

a lid detachably connected to the collar, wherein the inflatable balloon is disposed within the lid;

a filament attached to the balloon; and a battery-operated light assembly associated with the balloon.

18. The device of claim 17, including a reel rotatably connected to the collar and having the filament wound thereon.

19. The device of claim 17, including a one-way valve associated with the balloon for permitting the gas to pass into the balloon, and preventing escape of the gas from the balloon.

20. The device of claim 17, wherein the light assembly includes a light emitting diode.

21. The device of claim 20, wherein the light assembly includes two batteries biased towards one another and separated by a removable non-conductive flap.

* * * * *